United States Patent
Bonnelykke Kristensen et al.

(10) Patent No.: US 7,395,081 B2
(45) Date of Patent: Jul. 1, 2008

(54) MOBILE TELEPHONE HAVING A ROTATOR INPUT DEVICE

(75) Inventors: Jakob Bonnelykke Kristensen, Oalstykke (DK); Rasmus Christjansen, Ystad (SE); Henrik Balle, Copenhagen NV (DK); Lone Stagsted, Roskilde (DK); Janne Juul-Jakobsen, Copenhagen (DK); Christian Saxe Knudsen, Copenhagen (DK); Thomas Pederson, Frederiksberg (DK)

(73) Assignee: Nokia Corporation, Espoo (FI)

( * ) Notice: Subject to any disclaimer, the term of this patent is extended or adjusted under 35 U.S.C. 154(b) by 266 days.

(21) Appl. No.: 10/556,070

(22) PCT Filed: Mar. 30, 2004

(86) PCT No.: PCT/IB2004/000962

§ 371 (c)(1),
(2), (4) Date: Nov. 8, 2005

(87) PCT Pub. No.: WO2004/100510

PCT Pub. Date: Nov. 18, 2004

(65) Prior Publication Data

US 2006/0217144 A1    Sep. 28, 2006

(30) Foreign Application Priority Data

Sep. 15, 2003   (WO) .................. PCT/IB03/03926

(51) Int. Cl.
*H04M 1/00* (2006.01)
(52) U.S. Cl. .............. 455/550.1; 455/566; 455/90.3
(58) Field of Classification Search ......... 455/550.1, 455/575, 90, 566, 575.1, 90.3; 200/344, 200/11 R, 110 A; 345/184; 340/710; 715/773, 715/864
See application file for complete search history.

(56) References Cited

U.S. PATENT DOCUMENTS 4,365,349 A   12/1982   Ogita et al.

(Continued)

FOREIGN PATENT DOCUMENTS

EP   585 730 A1   8/1993

(Continued)

OTHER PUBLICATIONS

Rotary Cell-Phone Keypad (Human-sized keypad for micro-sized cell phones) www.halfbakery.com, Feb. 14, 2003.

*Primary Examiner*—Tan Trinh
(74) *Attorney, Agent, or Firm*—Banner & Witcoff, Ltd.

(57) ABSTRACT

A mobile telephone has a display (240) and a rotator input device (250) comprising a rotatable element and capable of generating commands for browsing and selecting objects on the display. It also has a wireless telecommunication interface to a mobile telecommunications network. A processing device is coupled to the display, the rotator input device and the wireless telecommunication interface. A text-handling software application is executable by the processing device. The processing device is configured, in a first operating mode, to provide first user input by way of the rotator input device (250), said first user input including a number sequence representative of a desired telephone number which is to be reached over the mobile telecommunications network, and to use said first user input when establishing a telephone call connection through the wireless telecommunication interface. Moreover, the processing device is configured, in a second operating mode, to provide second user input by way of the rotator input device, said second user input including a character sequence representative of a desired text, and to forward said second user input to the text-handling software application No numeric or alphanumeric character keyboard is involved in neither of the first and second operating modes.

19 Claims, 5 Drawing Sheets

U.S. PATENT DOCUMENTS

| | | | |
|---|---|---|---|
| 4,481,512 A | 11/1984 | Tscheulin et al. | |
| 4,866,542 A | 9/1989 | Shimada et al. | |
| 5,438,331 A | 8/1995 | Gilligan et al. | |
| 5,530,455 A | 6/1996 | Gillick et al. | |
| 5,808,602 A | 9/1998 | Sellers | |
| 5,818,437 A | 10/1998 | Grover et al. | |
| 5,825,353 A | 10/1998 | Will | |
| 5,915,228 A * | 6/1999 | Kunihiro et al. | 455/575.1 |
| 6,097,964 A | 8/2000 | Nuovo et al. | |
| 6,208,342 B1 | 3/2001 | Mugura et al. | |
| 6,232,959 B1 | 5/2001 | Pedersen | |
| 6,246,862 B1 | 6/2001 | Grivas et al. | |
| 6,297,795 B1 | 10/2001 | Kato et al. | |
| 6,337,694 B1 | 1/2002 | Becker et al. | |
| 6,392,640 B1 * | 5/2002 | Will | 345/184 |
| 6,396,006 B1 | 5/2002 | Yokoji et al. | |
| 6,487,424 B1 | 11/2002 | Kraft et al. | |
| 6,534,730 B2 | 3/2003 | Ohmoto et al. | |
| 6,670,563 B1 * | 12/2003 | Jeon | 200/11 R |
| 6,771,992 B1 * | 8/2004 | Tomura et al. | 455/575.1 |
| 6,801,849 B2 * | 10/2004 | Szukala et al. | 701/114 |
| 6,865,718 B2 | 3/2005 | Levi Montalcini | |
| 2002/0063684 A1 | 5/2002 | Tran | |
| 2002/0101515 A1 * | 8/2002 | Yoshida et al. | 348/211 |
| 2003/0001865 A1 | 1/2003 | Hirose et al. | |
| 2004/0118670 A1 * | 6/2004 | Park et al. | 200/344 |
| 2004/0218738 A1 * | 11/2004 | Arai et al. | 379/93.17 |
| 2004/0253931 A1 * | 12/2004 | Bonnelykke et al. | 455/90.3 |
| 2005/0090288 A1 * | 4/2005 | Stohr et al. | 455/566 |
| 2005/0273724 A1 * | 12/2005 | Joeressen et al. | 715/773 |
| 2007/0113204 A1 * | 5/2007 | Son et al. | 715/810 |

FOREIGN PATENT DOCUMENTS

| | | |
|---|---|---|
| EP | 0 755 142 A2 | 1/1997 |
| EP | 0930 760 A | 7/1999 |
| EP | 1 026 713 A | 8/2000 |
| EP | 1 150 242 A | 10/2001 |
| EP | 1 391 806 A | 2/2004 |
| WO | WO 00 59181 A | 10/2000 |
| WO | WO 02 39712 A2 | 5/2002 |
| WO | WO 02 091160 A | 11/2002 |
| WO | WO 02 095564 A | 11/2002 |
| WO | WO 03 036642 A2 | 5/2003 |

* cited by examiner

MOBILE TELEPHONE HAVING A ROTATOR INPUT DEVICE

This application is a U.S. National Stage of PCT/IB2004/000962, filed on 30 Mar. 2004, which claims priority to the following applications, all of which are incorporated by reference herein: U.S. Ser. No. 10/434,055, filed on 8 May 2003; U.S. Ser. No. 10/449,036, filed on 29 May 2003; U.S. Ser. No. 10/458,401, filed on 10 Jun. 2003; and PCT/IB03/03926 filed on 15 Sep. 2003.

FIELD OF THE INVENTION

The present invention relates to equipment for mobile telecommunications, and more particularly to a mobile telephone having a display, a rotator input device comprising a rotatable element and capable of generating commands for browsing and selecting objects on said display, a wireless telecommunication interface, a processing device and a text-handling software application which is executable by said processing device.

BACKGROUND OF THE INVENTION

Mobile telephones are becoming smaller and smaller. At some point the keyboard of a mobile telephone, typically a 12-button (alpha-)numeric keyboard commonly known as ITU-T keyboard, will become useless since it becomes too difficult for a user to press keys that are extremely small. Thus, the ITU-T keyboard may become a limiting factor which restricts the design of mobile telephones.

On the other hand, in modern mobile telephones the ITU-T keyboard plays several important roles and acts not only as a dialing keypad for manual entry of telephone numbers to call, but also as an alpha-numeric keyboard for text entry, a game control for arcade games, etc. As regards text entry, each key in the ITU-T keyboard often relates to several characters. A single key may, for instance, relate to the characters "a", "b" and "c". Pressing the key once produces the character "a", pressing the key twice within a short period of time produces the character "b", and pressing the key three times within a short period of time produces the character "c". Pressing the button twice slightly more slowly produces two "a":s. It is rather slow to use a keyboard in such a manner; therefore, various methods for facilitating text entry with an ITU-T keyboard have been developed. An example of such a method, wherein an object is to identify a word entered by a user, is disclosed in U.S. Pat. No. 5,818,437 and is generally known as T9.

Mobile telephones often have a graphical user interface. To facilitate operation of the graphical user interface, mobile telephones often have special navigation key(s), in addition to or integrated with the ITU-T keyboard, such as arrow keys or a combined multi-way navigation key. However, such additional navigation keys add on to the total size of the keyboard, thereby further limiting the freedom to design.

U.S. Pat. No. 6,097,964 discloses a mobile telephone 1 that in addition to an ITU-T keyboard 7 has a roller 10, which replaces traditional navigation key(s) and allows the user to operate the user interface by rotating and depressing the roller to issue commands for browsing and selecting objects in the user interface. The ITU-T keyboard 7 is still used for other purposes like manual dialing and text entry.

SUMMARY OF THE INVENTION

In view of the above, an objective of the invention is to solve or at least reduce the problems discussed above. In more particular, a purpose of the invention is to provide a user interface for a mobile telephone that allows a smaller design with fewer elements for manual input, but that still allows the user to perform two important actions of manual input, namely manual dialing of telephone numbers to call as well as text entry.

Generally, the above objectives and purposes are achieved by a mobile telephone according to the attached independent patent claim.

One aspect of the invention is a mobile telephone having a display; a rotator input device comprising a rotatable element and capable of generating commands for browsing and selecting objects on said display; a wireless telecommunication interface to a mobile telecommunications network; a processing device coupled to said display, said rotator input device and said wireless telecommunication interface; and a text-handling software application which is executable by said processing device. The processing device is configured, in a first operating mode, to provide first user input by way of said rotator input device, said first user input including a number sequence representative of a desired telephone number which is to be reached over said mobile telecommunications network, and to use said first user input when establishing a telephone call connection through said wireless telecommunication interface. Moreover, the processing device is configured, in a second operating mode, to provide second user input by way of said rotator input device, said second user input including a character sequence representative of a desired text, and to forward said second user input to said text-handling software application. No numeric or alphanumeric character keyboard is involved in neither of said first and second operating modes.

Hence, according to the invention, the mobile telephone may be designed without a traditional numeric or alphanumeric character keyboard, such as a 12-key ITU-T keyboard, and yet provide manual input options like manual dialing of telephone numbers to call as well as text entry. This has important advantages, since it allows greater freedom when designing the mobile telephone, facilitates miniaturization of the mobile telephone and permits realization with fewer components for manual input, i.e. a potential cost benefit. Furthermore, the invention provides for user input in an intuitive manner which makes space-efficient use of the available display area.

Advantageously, the processing device is configured to control the user interface of the mobile telephone essentially only based on user input made by way of the rotator input device. Controlling the user interface in this manner may include actions such as browsing menus and selecting menu items. For instance, the processing device may be configured to control, based on user input made by way of the rotator input device, at least one of the following user interface actions: entering the first operating mode, exiting the first operating mode, entering the second operating mode and exiting the second operating mode.

In one embodiment, the processing device is configured, in said first operating mode, to provide said first user input by displaying numbers on said display and receiving commands from said rotator input device for browsing said numbers and for selecting, in successive order, individual numbers that constitute said number sequence. Moreover, in said second operating mode, the processing device is configured to provide said second user input by displaying characters on said display and receiving commands from said rotator input device for browsing said characters and for selecting, in successive order, individual characters that constitute said character sequence.

In one embodiment, the mobile telephone has a front housing surface, said rotatable element of said rotator input device being rotatable in a plane substantially parallel to said front housing surface and being depressible so as to allow generation of said commands for browsing and selecting. The rotatable element of said rotator input device may be depressible in a direction substantially perpendicular to said front housing surface. Moreover, the rotatable element of said rotator input device may be tiltably depressible at a plurality of positions along its periphery so as to allow generation of different commands for browsing and selecting for different ones of said plurality of positions. Such a tiltably depressible rotatable element thus provides for many more selection options than for instance a roller as in aforesaid U.S. Pat. No. 6,097,964, where the roller is depressible in one direction only—downwardly towards the housing.

In one embodiment, the rotator input device has, in addition to said rotatable element, at least one depressible element, thereby allowing generation of said commands for browsing and selecting by rotation of said rotatable element and depression of said depressible element. The rotatable element of said rotator input device may comprise a ring with a center opening, wherein said at least one depressible element includes a depressible center key which is positioned in said center opening. The provision of such a center key will simplify certain operations such as marking text, since the center key may be conveniently depressed while simultaneously rotating the rotatable element. The depressible center key may be a four-way or five-way navigation key. Moreover, the at least one depressible element may comprise functional keys or soft keys disposed adjacently to said rotatable element.

In one embodiment, the rotator input device has a dynamic or selectable resolution for angular movement of said rotatable element, so that a given amount of angular movement will result in a corresponding amount of browsing or scrolling on said display which depends on an adjustable resolution setting. This resolution setting may be adjustable by at least one of the following: a user of the mobile telephone, an operating system in the mobile telephone, or a software application in the mobile telephone.

One embodiment further comprises a text prediction engine, wherein the processing device is configured, in said second operating mode, to display on said display a group of predicted characters that are available for browsing and selecting by way of said rotator input device. The text prediction engine may be configured to decide said group of predicted characters in response to a recently made user input and in accordance with a predefined inference logic. Advantageously, said recently made user input is a partial word; said predefined inference logic involves matching said partial word with a database of known and/or common words to predict most likely words that said partial word is part of; and said group of predicted characters, that is displayed on said display, is formed by a respective next character, following said partial word, in respective ones of said predicted most likely words.

In one embodiment, the processing device is configured in said second operating mode to display on said display, in addition to said characters, at least one control symbol that is available for browsing and selecting by way of said rotator input device, and wherein said at least one control symbol represents a user interface action that is performed upon selection of said control symbol. The at least one control symbol may represent at least one user interface action among the following: activating text prediction, deactivating text prediction, selecting a character set and selecting a cursor movement mode.

In one embodiment, the processing device is adapted to provide navigation within graphical data, which requires a larger presentation area than is available on said display, by: accepting a first rotational input made by way of said rotator input device as a desired pan direction for a sub area within said graphical data; accepting a second rotational input made by way of said rotator input device as a desired scrolling distance for said sub area in the selected pan direction within said graphical data; and presenting said sub area on said display.

Aforesaid telephone call connection may include at least one of the following: a voice call connection, a facsimile transmission connection and a data communication connection.

Aforesaid text-handling software application may include at least one of the following: a messaging application, a phonebook application, a calendar application, a notepad application, an Internet browser application, a WWW browser application, a WAP browser application, a contacts application, a camera application, an image recordal application, a video recordal application, an organizer application, a video game application, a calculator application, a voice memo application, an alarm clock application, a word processing application, a code memory application, a music player application, a media streaming application, and a control panel application, or any other application which uses at least one field for text input.

The mobile telephone may be adapted for use in GSM, UMTS, D-AMPS or CDMA2000, or another commercially available mobile telecommunications network.

Other aspects, objectives, features and advantages of the present invention will appear from the following detailed disclosure, from the attached dependent claims as well as from the drawings.

BRIEF DESCRIPTION OF THE DRAWINGS

The present invention will now be described in more detail, reference being made to the enclosed drawings, in which:

FIG. 2b is a schematic illustration of the rotator input device shown in FIG. 2a.

DETAILED DESCRIPTION OF THE INVENTION

A mobile telecommunications system in which the present invention may be applied will first be described with reference to FIG. 1.

Figure 1:
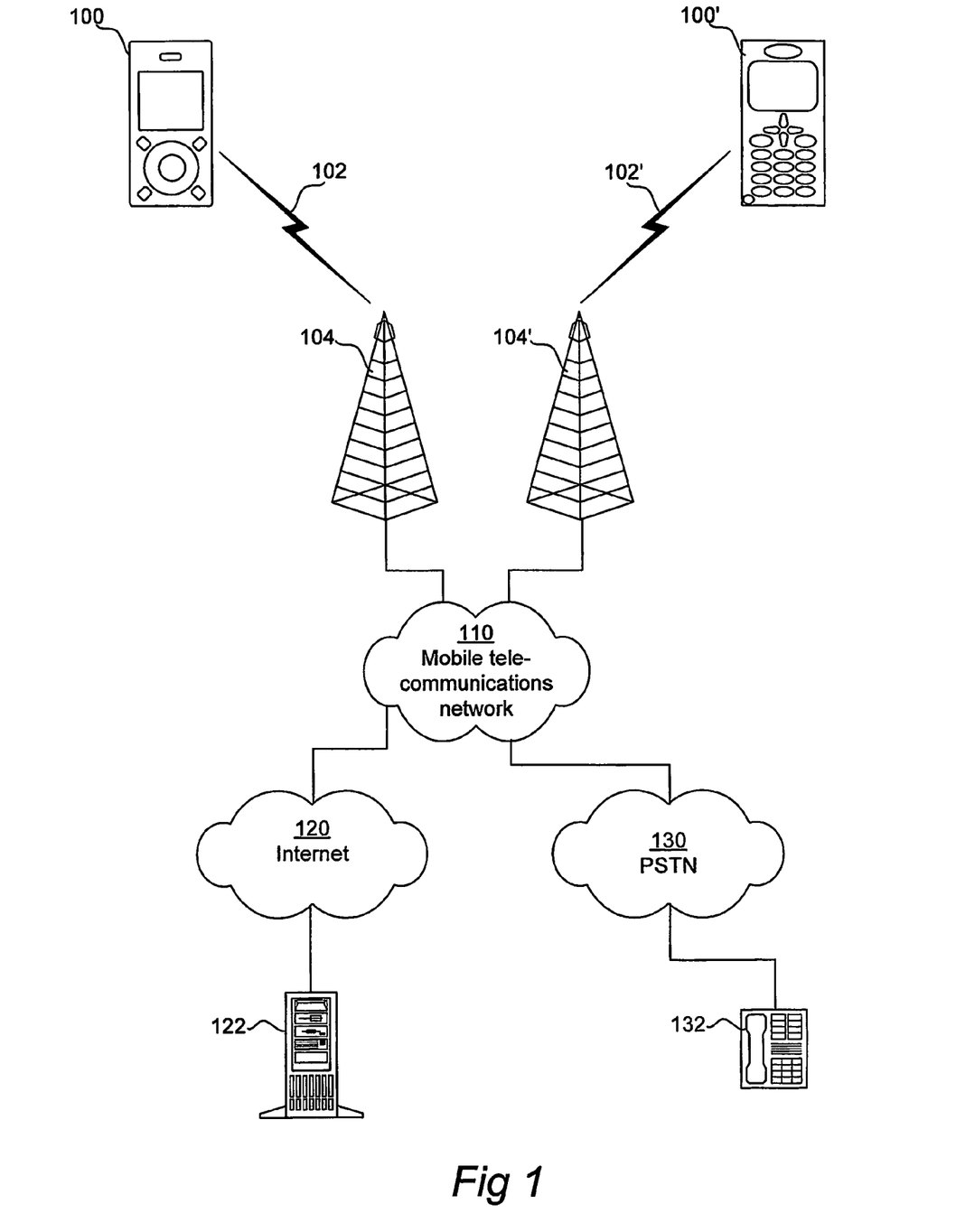
FIG. 1 is a schematic illustration of a mobile telecommunications system, including a mobile telephone 100, as an example of an environment in which the present invention may be applied.

In the telecommunications system of FIG. 1, various telecommunications services such as voice calls, data calls, facsimile transmissions, music transmissions, still image transmissions, video transmissions, electronic message transmissions and electronic commerce may be performed by way of a mobile telephone 100. The mobile telephone 100 is connected to a mobile telecommunications network 110 through an RF link 102 via a base station 104, as is well known in the art. The mobile telecommunications network 110 may be any commercially available mobile telecommunications system, such as GSM, UMTS, DAMPS or CDMA2000. The mobile telephone 100 is illustrated as a cellular phone but may alternatively be another similar kind of portable device, such as a portable/-personal digital assistant (PDA) or a communicator.

In the illustrated example, the mobile telephone 100 may be used for speech communication with users of other devices. Hence, speech may be communicated with a user of a stationary telephone 132 through a public switched telephone network (PSTN) 130 and the mobile telecommunications network 110, and with a user of another mobile terminal 100' which is connected to the mobile telecommunications network 110 over a wireless communication link 102'.

The mobile telecommunications network 110 is operatively connected to a wide area network 120, which may be Internet or a part thereof. Thus, the mobile telephone 100 may access a computer 122 connected to the wide area network 120 in accordance with specified protocols (such as TCP, IP and HTTP) and appropriate application software (such as a WAP or WWW browser, an email or SMS application, etc) in the mobile telephone 100.

The system illustrated in FIG. 1 serves exemplifying purposes only.

Figure 2A:
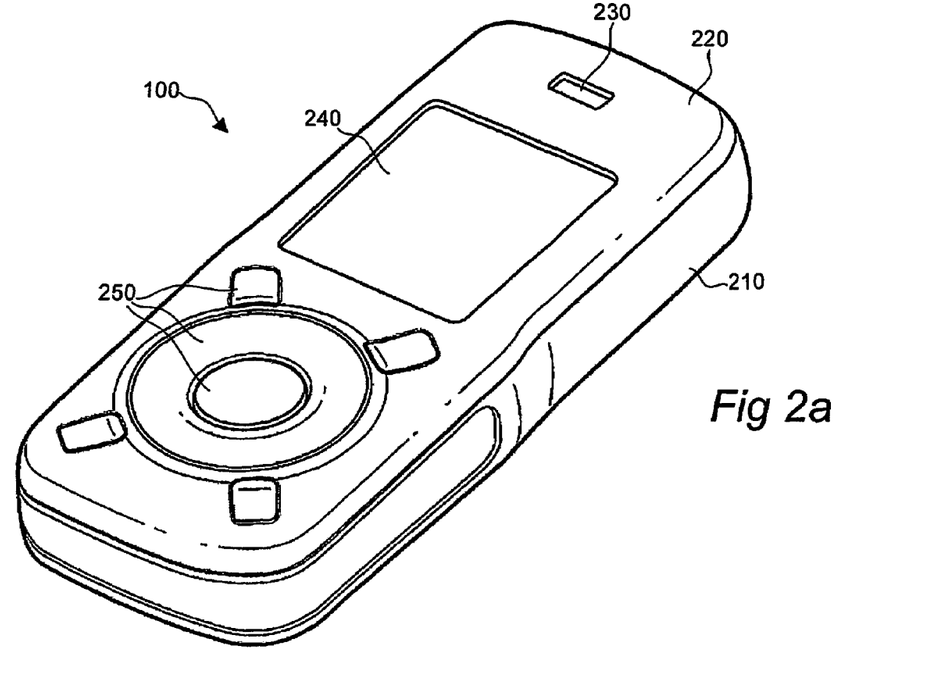
FIG. 2a is a schematic perspective view of the mobile telephone of FIG. 1, illustrating in more detail its user interface which includes a display and a rotator input device.

FIG. 2a illustrates the mobile telephone 100 of FIG. 1. The mobile telephone 100 has an apparatus housing 210. A front housing surface 220 of the mobile telephone 100 has a speaker 230, a microphone (not shown) and a display 240.

Figure 2B:
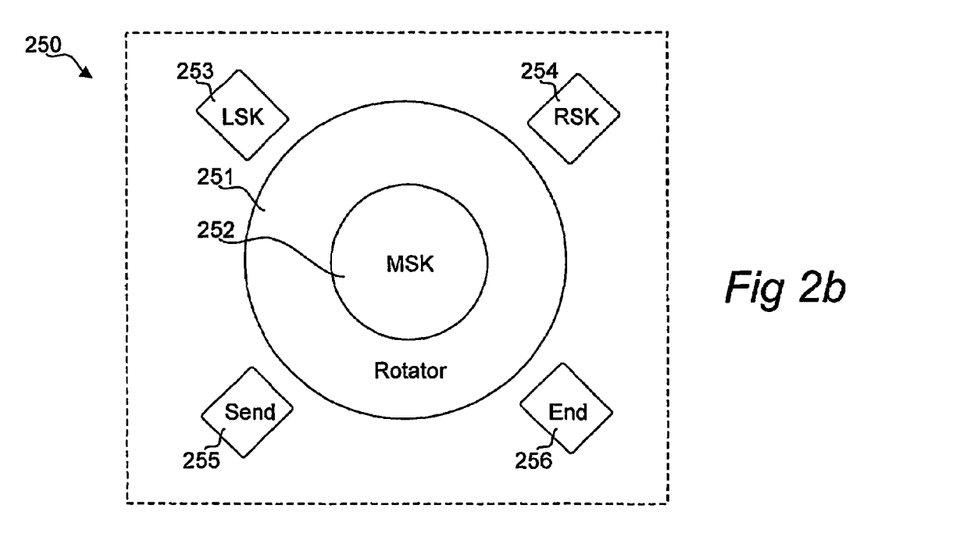

The mobile telephone 100 also has a rotator input device 250 for manual input, one embodiment of which is shown in more detail in FIG. 2b. In this embodiment, the rotator input device 250 is provided at the front housing surface 220 and has a ring-shaped rotatable element 251 ("Rotator") which is rotatable in a plane substantially parallel to the front housing surface 220. A depressible center key 252 ("MSK") is provided in a central opening in the rotatable element 251. By use of the rotatable element 251 the user may generate commands for browsing and selecting objects presented on the display 240 by rotating the rotatable element 251 and depressing the center key 252.

In another embodiment the rotatable element 251 may be depressible in a direction substantially perpendicular to the front housing surface 220. In such an embodiment, the depressive ability of the rotatable element 251 may replace the center key 252, so that no such center key is included in the rotator input device 250. Still other embodiments of the rotator input device 250 will be described later with reference to FIG. 8.

The embodiment of FIG. 2a also has, in addition to the rotatable element 251, four depressible functional keys or soft keys 253-256 that are equidistantly distributed along the periphery of element 251. These keys include right and left softkeys 253 and 254 ("LSK" and "RSK"), a Send key 255 (corresponding to Call/Yes/OK on various existing telephone models) and an End key 256 (corresponding to Hangup/No/Cancel). As will be appreciated by a man skilled in the art, the keys 253-256 will be assigned different functions or actions in different situations in the user interface.

Figure 7A:
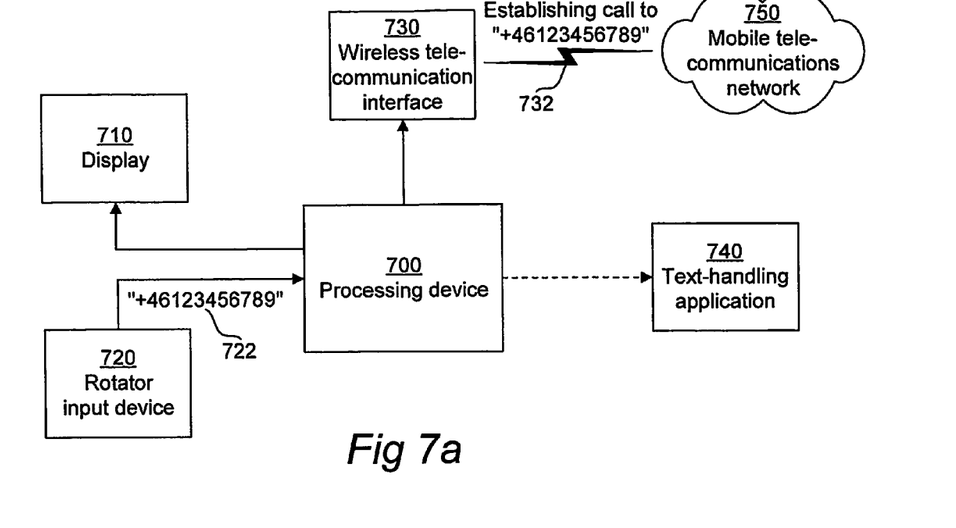
FIGS. 7a and 7b are block diagrams that illustrate the mobile telephone according to the present invention in the first operating mode and in the second operating mode, respectively.
Figure 7B:
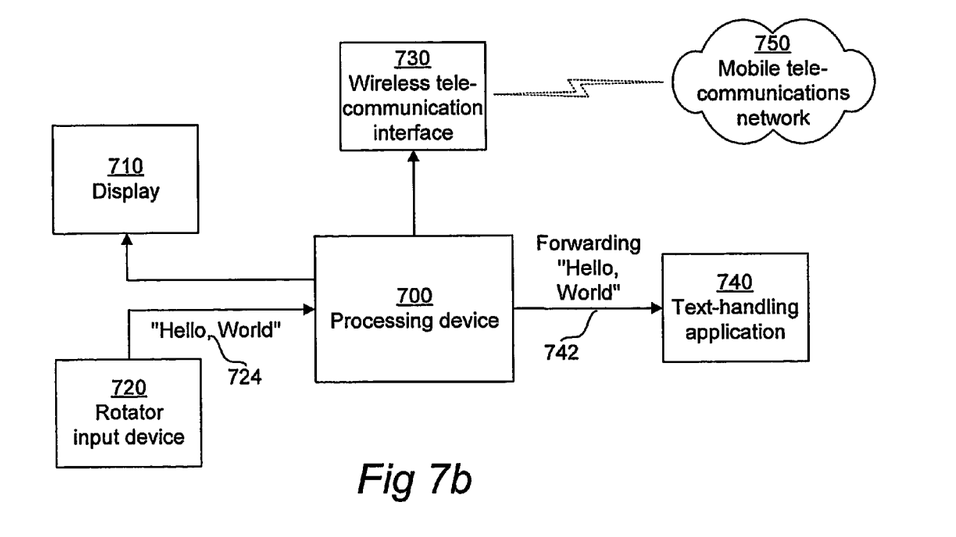

A first operating mode, for manual dialling of a telephone number to call, will now be described with reference to FIG. 2b and FIG. 7a. As seen in FIG. 7a, the mobile telephone 100 comprises, on a general level, a processing device 700, a display 710 (corresponding to 240 in FIG. 2a), aforesaid rotator input device (labeled 250 in FIG. 2a-b and 720 in FIG. 7a) and a wireless telecommunication interface 730 to the mobile telecommunications network (labeled 110 in FIG. 1 and 750 in FIG. 7a). A text-handling software application 740 is executed by the processing device 700. In the first operating mode, though, the text-handling software application 740 is not involved. Instead, a manual dialling routine is executed, either as a separate application or as a part of an operating system in the mobile telephone 100. In the manual dialling routine, the user may enter a number sequence 722 which indicates a desired telephone number that is to be reached over the mobile telecommunications network 750. In more detail, the individual symbols (digits or control characters) of this number sequence will be entered one by one in successive order by rotating the rotatable element 251 to browse or scroll a set of available symbols, such as "0123456789+#*", on the display 710, followed by selection of the desired individual symbol by depressing the center key 252. The user may indicate completion of the desired number sequence 722 by pressing one of the keys 253-256, such as the Send key 255, wherein the processing device will establish a call 732 to the subscriber of the desired telephone number 722 in the mobile telecommunications network 750 via the wireless telecommunication interface 730. As is seen, the set of available symbols include all characters that may be necessary in order to enter a desired telephone number, wherein there is no need for the mobile telephone 100 to include a conventional ITU-T (alpha-)numeric keyboard.

A second operating mode, for text entry into the text-handling software application 740, will now be described with reference to FIGS. 2b, 4, 5, 6 and 7b. The text-handling software application may be an application which uses at least one field for text input; it is exemplified in FIGS. 4 and 5 as a messaging application for SMS, MMS and/or email. In the second operating mode, the user may enter a character sequence 724 representative of a desired text that is to be forwarded, at 742, by the processing device 700 to the text-handling application 740. In more detail, the individual symbols (such as letters, digits, punctuation symbols, control characters, etc) of this character sequence will be entered one by one in successive order by rotating the rotatable element 251 to browse or scroll a set of available symbols 600 (FIG. 6) on the display 710, followed by selection of the desired individual symbol 532 (FIG. 4) by depressing the center key 252. The user may indicate completion of the desired character sequence 724 by pressing one of the keys 253-256, wherein the processing device 700 will forward the entered character sequence 724 to the text-handling application 740. Again, as with the first operating mode, there is no need for the mobile telephone 100 to include a conventional ITU-T (alpha-)numeric keyboard.

Figure 4:
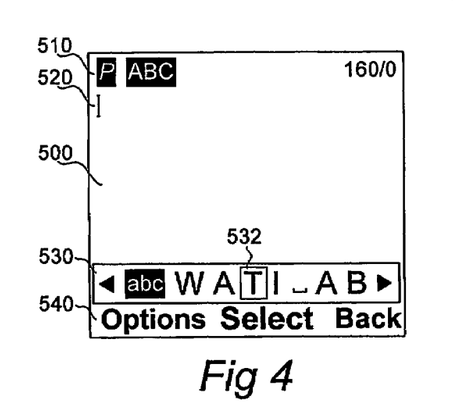
FIGS. 4 and 5 illustrate screen snapshots of the telephone display in the second operating mode for text entry by way of the rotator input device into a text-handling software application.
Figure 5:
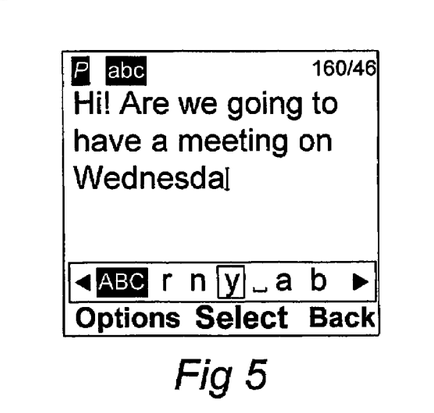

Reference is now made to FIGS. 4 and 5, which illustrate the information shown on the display 240/710 in the given example of the second operating mode. FIG. 4 shows a display screen snapshot 500 when a new SMS message is just about to be entered by the user. A status bar 510 at the top of the screen includes information that text prediction is active ("P"), that the current character set is upper-case Latin letters ("ABC") and that 0 characters out of a maximum of 160 have been entered. A cursor 520 indicates the position on the screen where the text input is to take place. FIG. 5 shows a display screen snapshot when the SMS message has been partly entered (46 characters). At the lower part of the screen 500, a symbol selection window 530 presents a subset of all currently available symbols 600. The symbol ("T") at the center of this window is marked by a frame 532 and is the one that will be selected if the user presses Select (center key 252). Arrows at either sides of the selection window 530 indicate to the user that he may scroll the available symbols by rotating the rotatable element 251 in either direction, wherein the presented subset of all currently available symbols 600 will change accordingly.

Figure 6:
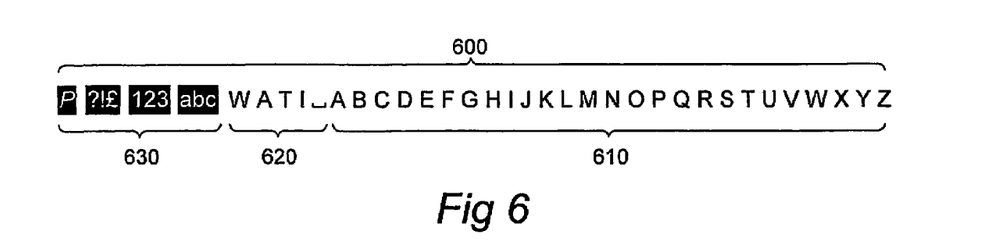
FIG. 6 illustrates a set of symbols that the user may browse, and select symbols from, by way of the rotator input device, the set of symbols including a full character set as well as a group of predicted characters and a group of control symbols.

As seen in FIG. 6, the set of all currently available symbols 600 is made up of a full character set 610 (currently upper-case Latin letters in FIG. 6 and also in FIG. 4, but lower-case Latin letters in FIG. 5), a group of predicted characters 620 and a group of control symbols 630. The control symbols 630 include one symbol ("P") which upon selection in the selection window 530 will toggle text prediction on and off (i.e., activate and deactivate text prediction). They also include character set selecting symbols, "abc", "123" and "?!£", which upon selection will result in a substitution of the current full character set 610 with lower-case Latin letters, numerical/mathematical characters and punctuation symbols/special symbols, respectively. Of course, many other characters sets than these examples may be used with the invention. For instance, when the mobile telephone 100 is used for text entry in the Chinese language, the control symbols 630 may include symbols for selecting which input mode to use—e.g. Pinyin, Zhuyin or Stroke.

The control symbols 630 may relate also to other control functions than the ones referred to above; one example is a control symbol for cursor movement mode. Upon entry into the cursor movement mode, the symbols 600 are no longer scrollable and selectable in the selection window 530. Instead, clockwise movement of the rotatable element 251 will move the cursor 520 forwardly in the entered text, whereas counter-clockwise movement of the rotatable element 251 will move the cursor 520 backwardly. When the cursor has been repositioned to the desired position, the cursor movement mode may be exited by depressing the center key 252, wherein the second operating mode (text entry mode) will be resumed. Also, other application-specific (control) commands such as SEND, SAVE, CLEAR, etc, could be added to the control symbols 630. A detailed description is given in U.S. patent application Ser. No. 10/434,055, from which priority is claimed and which is incorporated herein by reference in its entirety.

In the embodiment shown in FIGS. 4-6, text prediction facilitates the character input. In more detail, in contrast to known text prediction schemes such as T9, which operate to predict and present complete words for selection, the text prediction in this embodiment operates to predict and present the next individual characters only based on a predefined inference logic. More specifically, a text prediction engine in the mobile telephone 100 provides a group of candidates for the next most likely character based on the already entered text. As already mentioned, such a group of predicted characters 620 are presented in the selection window 530, together with surrounding parts of the set of all currently available symbols 600, wherein the most likely character 532 in the candidate group is centered and focused in the selection window 530 for maximum ease of selection by the user. Thus, in FIG. 4 the text prediction engine has predicted the characters "W", "A", "T" and "I" as the four most probable characters to start a new word with, whereas in FIG. 5 the text prediction engine has predicted the three characters "r", "n" and "y" as the most likely ones to follow or complete the partly entered word "Wednesda" with.

Thus, the content of the group of predicted characters 620 is updated each time a new user input has been received (i.e. once a new character has been selected by the rotator input device 250/720). The text prediction engine applies the inference logic to decide which characters to include in the group of predicted characters 620 at each time. The decision is based on the already made text input—preferably the most recent part(s) of the already made text input, such as the immediately preceding character(s) in the input.

In one embodiment, the inference logic is based on bigram statistics for the current language, wherein the most recent input character (e.g. "a" in FIG. 5) will be used by the text prediction engine to compare with a reference database, containing pairs of characters and their respective probabilities in the current language, and find the most likely character pairs that start with the most recent input character (e.g. "a"). In another embodiment, the inference logic is based on trigram statistics, thus using the two most recent input characters (e.g. "da" in FIG. 5) in the prediction. In still another embodiment, the text prediction engine uses a database of known and/or common words in the current language and matches a current partial word input (e.g. "Wednesda" in FIG. 5) with the words stored in the data-base to find the most likely words that the user is about to enter. However, such most likely words are not presented in their entirety on the display; in contrast only the respective next characters in the predicted words are included in the group of predicted characters 620 (e.g. "y" from "Wednesday"). Advantageously, the database of known and/or common words may be updated by the user and/or by downloading from an external data source.

In one embodiment, the text prediction engine may be configured to be activated only once a very first character has been entered in a new text entry session (e.g. so that not a predicted "T" but the first character "A" of the current full character set 610 is centered and focused in the selection window 530 when an empty SMS message is about to be filled with text).

The rotator input device 250/720 may be used for many other purposes than the first and second operating modes described above. One example is a password entry mode, wherein the available symbols 600 that are scrollable and selectable in the selection window 530 may vary between applications. In some cases the available symbols may be limited to numbers (e.g. in a SIM access control mode where a PIN code is required), and in other cases both letters and numbers may be allowed (e.g. in a WAP login mode). One example that further shows the intuitiveness of using a rotator is the possibility of using the rotator for code inputs like a number wheel on a safe with number scrolling (either linear or circular) with possibly added clicking sounds. Another example is a date/time entry mode, for instance in a calendar application or an alarm clock application, wherein the available symbols may include "0123456789", ":" and "/". Still other examples involve multimedia players, where the rotator input device 250/720 may be used for browsing and selecting in a list of media files, for controlling volume settings, etc.

In one embodiment, the rotator input device is used also for navigation in graphical data such as images presented on the display 240/710 by an application such as a WAP or WWW browser, an image editor or a picture viewer. More particularly, whenever such graphical data requires a presentation area which is too large to fit on the display 240/710, the following navigation method may be used. Initially a sub area of the required presentation area will be shown on the display at a start position, such as the uppermost/leftmost part of the required presentation area, the size of the sub area preferably corresponding to the size of the available presentation area of the display. To navigate within the required presentation area, by rotation of the rotatable element 251, the user will select a desired pan direction for the sub area to be presented. Then, again by rotation of the rotatable element 251, the user will select a desired scrolling distance, in the selected direction within the required presentation area, for the sub area to be presented. In response, the selected sub area of the required presentation area, located at the position determined by the selected direction and distance as displaced from the start position, will be presented on the display. A detailed description is given in PCT Application No. PCT/IB03/03926, from which priority is claimed and which is incorporated herein by reference in its entirety.

Figure 3:
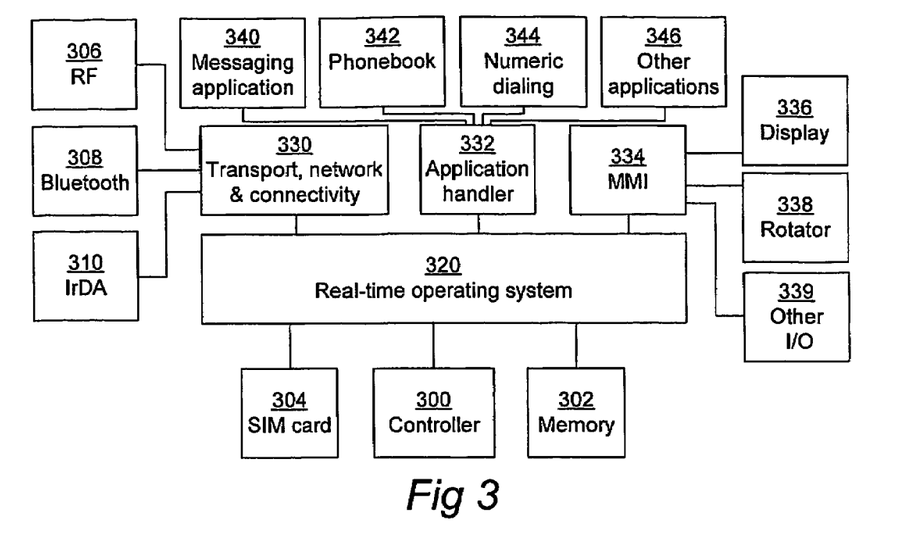
FIG. 3 is a schematic block diagram of the hardware and software structure of the mobile telephone of FIGS. 1 and 2ab.

FIG. 3 illustrates the internal structure of the mobile telephone 100. A controller 300, which may realise the processing device 700 of FIG. 7, is responsible for the overall operation of the apparatus and is preferably implemented by any commercially available CPU ("Central Processing Unit"), DSP ("Digital Signal Processor") or any other electronic programmable logic device. The controller 300 has associated electronic memory 302 such as RAM memory, ROM memory, EEPROM memory, flash memory, or any combination thereof. The memory 302 is used for various purposes by the controller 300, one of them being for storing data and program instructions for various software in the portable communication apparatus. The software includes a real-time operating system 320, man-machine interface (MMI) drivers 334, an application handler 332 as well as various applications. The applications include a messaging application 340 (which may be the text-handling application referred to above in conjunction with the second operating mode), a phonebook application 342, a numeric dialing application 344 (which may be the manual dialing routine referred to above in conjunction with the first operating mode) and other applications 346 which are not referred to in detail. The MMI drivers 334 cooperate with various MMI or input/-output (I/O) devices, including the display 336 (240, 710), the rotator input device 338 (250, 720), as well as other input/output devices 339 such as a camera, the microphone, the speaker 230, a vibrator, a ringtone generator, an LED indicator, etc. As is commonly known, a user may operate the apparatus through the man-machine interface thus formed.

The text prediction engine may be included in said set of MMI drivers 334 or may be provided as separate software executable by the controller 300. In other embodiments it may be realised as partly or entirely in hardware, for instance in the form of an ASIC ("Application-Specific Integrated Circuit").

The software also includes various modules, protocol stacks, drivers, etc., which are commonly designated as 330 and which provide communication services (such as transport, network and connectivity) for an RF interface 306, a Bluetooth interface 308 and an IrDA interface 310. The RF interface 306 may realise the wireless telecommunication interface 730 and comprises an internal or external antenna as well as appropriate radio circuitry for establishing and maintaining a wireless link to a base station (e.g. link 102 to base station 104 in FIG. 1). As is well known to a man skilled in the art, the radio circuitry comprises a series of analogue and digital electronic components, together forming a radio receiver and transmitter. These components include, i.a., band pass filters, amplifiers, mixers, local oscillators, low pass filters, AD/DA converters, etc.

The apparatus 100 also has a SIM card 304 and an associated reader. As is commonly known, the SIM card 304 comprises a processor as well as local work and data memory.

The text entry according to aforesaid second operating mode may be received and used for various purposes in a variety of applications, including aforesaid messaging and phonebook applications 340, 342, as well as for instance a notes application, a contacts application, an Internet browser application, a WWW browser application, a WAP browser application, a camera application, an image recordal application, a video recordal application, an organizer application, a video game application, a calculator application, a voice memo application, an alarm clock application, a word processing application, a code memory application, a music player application, a media streaming application, and a control panel application, or any other application which uses at least one field for text, character or symbol input.

Figure 8:
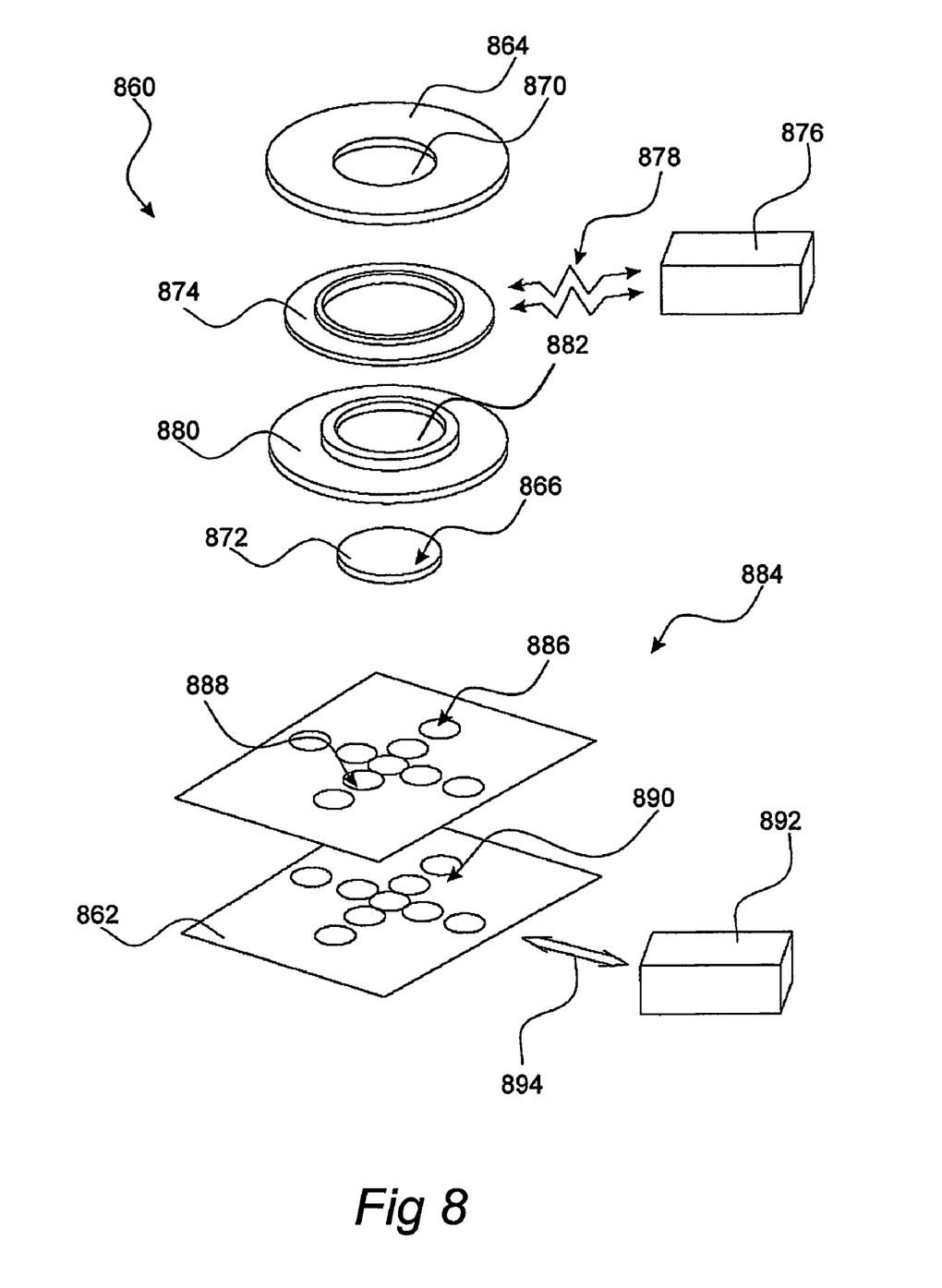
FIG. 8 shows an exploded view of a rotator input device according to one embodiment of the present invention.

FIG. 8 shows a rotator input device 860 according to one embodiment. A detailed description is given in U.S. patent application Ser. No. 10/458,401, from which priority is claimed and which is incorporated herein by reference in its entirety. The rotator input device 860 comprises a support 862 for supporting a rotatable and tiltably depressible element 864. Further, the rotator input device 860 comprises a navigation key 866 supported by the support 862. In addition, even if not shown in the drawing, the rotator input device 860 may optionally comprise a set of soft keys or function keys, for instance like the keys 253-256 of FIG. 2*b*.

As seen in FIG. 8, the rotatable element 864 has a center opening 870 so as to allow for the depression surface 872 of the navigation key 866 to be accessed through said opening 870. The rotatable element 864 is arranged on a motion detector element 874 communicating with a converter 876 through communicating means 878. The motion detector element 874 may be configured to utilize electromagnetic, magnetic, electrical, acoustic, mechanical or optical coupling to determine angular motion of the rotatable element 864.

When the motion detector element 874 utilizes electromagnetic, magnetic, electrical, acoustic or optical coupling, a transmitter for transmitting an incident signal onto the motion detector element 874 and a receiver for receiving the reflected incident signal from the motion detector element 874 are incorporated in the converter 876.

When the motion detector element 874 utilizes mechanical coupling, the communicating means 878 may be constituted by a mechanical lever coupling to an indented area of the motion detector element 874 so that angular motion of the rotatable element causes the lever to vibrate.

The motion detector element 874 is supported by a bearing element 880 enabling rotation of the interlocked ring-shaped rotatable element 864 and motion detector element 874. The bearing element 880 comprises an opening 882 for receiving the navigation key 866. In this embodiment, the navigation key 866 is not supported by the bearing element 880 and thus is not rotatable.

The rotator input device 860 further comprises a switching assembly designated in entirety by reference numeral 884.

The switching assembly 884 comprises a first sheet incorporating a first set of domes or switching elements 886 for communicating with the rotatable element 864 when depressed, and a second set of domes or switching elements 888 for communicating with the navigation key 866 when depressed. The domes 886 and 888 comprise an upper and a lower surface layer separated by a space, which during alteration detectably changes electrical characteristics. The change in electrical characteristics is identified by corresponding detectors 890 on the support 862. The changes detected by the detectors 890 are communicated to a translator 892 through communication means 894. The communication means 894 and the translator 892 may be provided and integrated directly on the support 862, which may be a printed circuit board (PCB).

Thus, in summary, the rotator input device 860 may detect angular motions of the rotatable element 864 in clockwise and counter-clockwise directions by way of the converter 876, and in response generate commands for browsing objects on the display 710 in cooperation with the processing device 700. Moreover, the rotator input device 860 may detect depressions of the rotatable element 864 at its periphery by way of the domes 886, the detectors 890 and the translator 892, and in response generate commands for browsing and/or selecting objects on the display 710 in cooperation with the processing device 700. Furthermore, the rotator input device 860 may detect depressions of the navigation key 866 in the center of the rotatable element 864 by way of the domes 888, the detectors 890 and the translator 892, and in response generate commands for browsing and/or selecting objects on the display 710 in cooperation with the processing device 700.

Hence, in the disclosed embodiment, the depressible rotatable element 864 serves as a normal rotator for angular or "continuous" browsing/scrolling, and as a four-way navigation key for "discrete" browsing/scrolling/selection in four orthogonal directions. Conveniently, the four different depressible positions ("north, east, south, west") at the periphery of the rotatable element 864 may be assigned different commands for browsing and selecting. Thus, virtually all kinds of input can be made through the depressible rotatable element 864, wherein the user will not have to move his fingers much at all and wherein the input will be faster and more intuitive. The navigation key 866 serves as a five-way key for "discrete" browsing/scrolling/selection in four orthogonal directions (by depressing the navigation key 866 at its periphery) as well as for pure selecting actions by depressing the navigation key 866 at its center.

In an alternative embodiment, the embodiment of FIG. 8 is modified by excluding the navigation key 866 from the rotator input device 860 and using only the depressible rotatable element 864. In other embodiments, the number of domes 886 or 888 may be different from the numbers shown in FIG. 8. Furthermore, more than one dome, or even all domes, may be assigned the same function, for instance so that it will make no difference which part of the rotatable element 864 that is depressed for selecting such a function.

In still an alternative embodiment, the rotator input device 860 has a dynamic or selectable resolution for the angular (rotational) movement of the rotatable element 864, in the sense that a given amount of angular movement will be interpreted differently, as regards the corresponding amount of browsing/scrolling it shall be held to represent, by the processing device 700 or the converter 876 depending on an adjustable resolution setting, which may be updated by the user, the operating system 320 or any of the software applications 340-346. In this way, the resolution may vary between applications (such as a high resolution in a text-handling application and a lower resolution in an arcade game), between users with different preferences (such as a disabled person that may prefer a low resolution, whereas a skilled and non-handicapped person may prefer a higher resolution), or between different scopes or modes within one application. A detailed description is given in U.S. patent application Ser. No. 10/449,036, from which priority is claimed and which is incorporated herein by reference in its entirety.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An anparatus comprising:

a display;

a rotator input device comprising a rotatable element and capable of generating commands for browsing and selecting objects on said display;

a wireless telecommunication interface to a mobile telecommunications network;

a processing device coupled to said display, said rotator input device and said wireless telecommunication interface;

a text-handling software application which is executable by said processing device; and a text prediction engine, wherein the processing device is configured, in a first operating mode, to provide first user input by way of said rotator input device, said first user input including a number sequence representative of a desired telephone number which is to be reached over said mobile telecommunications network, and to use said first user input when establishing a telephone call connection through said wireless telecommunication interface;

wherein the processing device is configured, in a second operating mode, to provide second user input by way of said rotator input device, said second user input including a character sequence representative of a desired text, and to forward said second user input to said text-handling software application;

wherein the processing device is configured, in said second operating mode, to provide said second user input by displaying characters on said display and receiving commands from said rotator input device for browsing said characters and for selecting, in successive order, individual characters that constitute said character sequence; and wherein the processing device is configured, in said second operating mode, to display on said display a group of predicted characters that are available for browsing and selecting by way of said rotator input device;

wherein said text prediction engine is configured to decide said group of predicted characters in response to a recently made user input and in accordance with a predefined inference logic, and wherein said recently made user input is a partial word, and wherein said predefined inference logic involves matching said partial word with a database of known and/or common words to predict most likely words that said partial word is part of, and wherein said group of predicted characters, that is displayed on said display, is formed by a respective next character only, following said partial word, in respective ones of said predicted most likely words;

wherein no numeric or alphanumeric character keyboard is involved in said first and second operating modes.

2. An apparatus as defined in claim 1, wherein the processing device is configured, in said first operating mode, to provide said first user input by displaying numbers on said display and receiving commands from said rotator input device for browsing said numbers and for selecting, in successive order, individual numbers that constitute said number sequence.

3. An apparatus as defined in claim 1, wherein said mobile telephone has a front housing surface, said rotatable element of said rotator input device being rotatable in a plane substantially parallel to said front housing surface and being depressible so as to allow generation of said commands for browsing and selecting.

4. An apparatus as defined in claim 3, wherein said rotatable element of said rotator input device is depressible in a direction substantially perpendicular to said front housing surface.

5. An apparatus as defined in claim 3, wherein said rotatable element of said rotator input device is tiltably depressible at a plurality of positions along its periphery so as to allow generation of different commands for browsing and selecting for different ones of said plurality of positions.

6. An apparatus as defined claim 1, wherein said rotator input device has, in addition to said rotatable element, at least one depressible element, thereby allowing generation of said commands for browsing and selecting by rotation of said rotatable element and depression of said depressible element.

7. An apparatus defined in claim 6, wherein the rotatable element of said rotator input device comprises a ring with a center opening and wherein said at least one depressible element includes a depressible center key which is positioned in said center opening.

8. An apparatus as defined in claim 7, wherein said depressible center key is a four-way or five-way navigation key.

9. An apparatus as defined in claim 7, wherein said at least one depressible element further comprises functional keys or soft keys disposed adjacently to said rotatable element.

10. An apparatus as defined in claim 1, wherein said rotator input device has a dynamic or selectable resolution for angular movement of said rotatable element, so that a given amount of angular movement will result in a corresponding amount of browsing or scrolling on said display which depends on an adjustable resolution setting.

11. An apparatus as defined in claim 10, wherein said resolution setting is adjustable by at least one of the following: a user of the mobile telephone, an operating system in the mobile telephone, or a software application in the mobile telephone.

12. An apparatus as defined in claim 1, wherein the processing device is configured, in said second operating mode, to display on said display, in addition to said characters, at least one control symbol that is available for browsing and selecting by way of said rotator input device, and wherein said at least one control symbol represents a user interface action that is performed upon selection of said control symbol.

13. An apparatus as defined in claim 12, wherein said at least one control symbol represents at least one user interface action among the following: activating text prediction, deactivating text prediction, selecting a character set and selecting a cursor movement mode.

14. An apparatus as defined in claim 1, wherein said telephone call connection includes at least one of the following: a voice call connection, a facsimile transmission connection and a data communication connection.

15. An apparatus as defined in claim 1, wherein said text-handling software application includes at least one of the following: a messaging application, a phonebook application, a calendar application, a notepad application, an Internet browser application, a WWW browser application, a WAP browser application, a contacts application, a camera application, an image recordal application, a video recordal application, an organizer application, a video game application, a calculator application, a voice memo application, an alarm clock application, a word processing application, a code memory application, a music player application, a media streaming application, and a control panel application, or any other application which uses at least one field for text input.

16. An apparatus as defined in claim 1, wherein the processing device is configured to control a user interface of said mobile telephone essentially only based on user input made by way of said rotator input device.

17. An apparatus as defined in claim 16, wherein the processing device is configured to control, based on user input made by way of said rotator input device, at least one of the following user interface actions: entering said first operating mode, exiting said first operating mode, entering said second operating mode and exiting said second operating mode.

18. An apparatus comprising:
a display;
a rotator input device comprising a rotatable element and capable of generating commands for browsing and selecting objects on said display;
a wireless telecommunication interface to a mobile telecommunications network;
a processing device coupled to said display, said rotator inpid device and said wireless telecommunication interface; and
a text-handling software applicalion which is executable by said processing device,
wherein the processing device is configured, in a first operating mode, to provide first user input by way of said rotator input device, said first user input including a number sequence representative of a desired celephone mirnber which is to be reached over said mobile telecommunications network, and to use said first user input when establishing a telephone call connection through said wireless telecommunication interface;
wherein the processing device is configured, in a second operating mode to provide second user input by way of said rotator input device, said second user input including a character sequence representative of a desired text, and to forward said second user input to said text-handling software application;
wherein no numeric or alphanumeric character keyboard is involved in said first and second operating modes;
wherein the processing device is adapted to provide navigation within graphical data, which requires a larger presentation area than is available on said display, by:
accepting a first rotational input made by way of said rotator input device as a desired pan direction for a sub area within said graphical data;
accepting a second rotational input made by way of said rotator input device as a desired scrolling distance for said sub area in the selected pan direction within said graphical data; and
presenting said sub area on said display.

19. A method comprising:
providing a fast operating mode that generates first user input by way of a rotator input device, said first user input including a number sequence representative of a desired telephone number which is to be reached ova a mobile telecommunications network, and to use said first user input when establishing a telephone call connection through a wireless telecommunication interface with said mobile telecommunications network, wherein said rotator input device comprises a rotatable element and is capable of generating commands for browsing and selecting objects on a display; and providing a second operating mode that generates second user input by way of the rotator input device, said second user input including a character sequence representative of a desired text, and to forward said second user input to a text-handling software application, wherein generating the character sequence comprises:

determining a group of predicted characters in response to a recently made user input and in accordance with a predefined inference logic that matches a partial word with a database of known and/or common words to predict most likely words that said partial word is part of, and displaying the group of predicted characters on said display and receiving commands from said rotator input device for browsing said characters and for selecting, in successive order, individual characters that constitute said character sequence, wherein said group of predicted characters is fonned by a respective next character only, following said partial word, in respective ones of said predicted most likely words, wherein no numeric or alphanumeric character keyboard is involved in said first and second operating modes.

\* \* \* \* \*

UNITED STATES PATENT AND TRADEMARK OFFICE
CERTIFICATE OF CORRECTION

PATENT NO.         : 7,395,081 B2                                    Page 1 of 1
APPLICATION NO. : 10/556070
DATED              : July 1, 2008
INVENTOR(S)        : Jakob Bonnelykke Kristensen et al.

It is certified that error appears in the above-identified patent and that said Letters Patent is hereby corrected as shown below:

In Column 14, Claim 18, Line 32:
    Please replace "inpid" with --input--

In Column 14, Claim 18, Line 34:
    Please replace "applicalion" with --application--

In Column 14, Claim 18, Lines 39-40:
    Please replace "celephone mirnber" with --telephone number--

In Column 14, Claim 19, Line 64:
    Please replace "fast" with --first--

In Column 14, Claim 19, Line 67:
    Please replace "ova" with --over--

In Column 16, Claim 19, Line 10:
    Please replace "fonned" with --formed--

Signed and Sealed this

Twenty-sixth Day of May, 2009

JOHN DOLL
*Acting Director of the United States Patent and Trademark Office*